(12) United States Patent
Yoon et al.

(10) Patent No.: US 8,274,473 B2
(45) Date of Patent: Sep. 25, 2012

(54) ELECTRO-OPTIC DISPLAY

(75) Inventors: Seon-Tae Yoon, Seoul (KR); Jae-Byung Park, Seongnam-si (KR); Hae-Il Park, Seoul (KR); Sung-Jin Hong, Seoul (KR); Yu-Kwan Kim, Incheon (KR); Seul Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 767 days.

(21) Appl. No.: 12/433,246

(22) Filed: Apr. 30, 2009

(65) Prior Publication Data

US 2010/0085299 A1  Apr. 8, 2010

(30) Foreign Application Priority Data

Oct. 8, 2008 (KR) .................. 10-2008-0098650

(51) Int. Cl.
*G09G 3/34* (2006.01)
*G02F 1/15* (2006.01)
*G02F 1/1343* (2006.01)
(52) U.S. Cl. ........ 345/107; 345/105; 349/143; 349/144; 359/265
(58) Field of Classification Search .......... 345/102, 345/105, 107; 349/143, 144; 359/254, 265; 252/299.5
See application file for complete search history.

(56) References Cited

U.S. PATENT DOCUMENTS 5,582,700 A * 12/1996 Bryning et al. ............... 204/450
2002/0003597 A1 * 1/2002 Shin et al. ..................... 349/110

FOREIGN PATENT DOCUMENTS

| JP | 2003-107234 | 4/2003 |
| JP | 2006-201603 | 8/2006 |
| KR | 10-2005-0064366 | 6/2005 |

OTHER PUBLICATIONS

English translation for unexamined publication No. KR-1020050064366 by computer provided by KIPO, 2005.*

* cited by examiner

*Primary Examiner* — Shean C Wu
(74) *Attorney, Agent, or Firm* — Innovation Counsel LLP (57) ABSTRACT

An electro-optic display includes a first substrate provided thereon with a first electrode, a second substrate provided thereon with a second electrode forming an electric field in cooperation with the first electrode, and an electro-optic material interposed between the first and second substrates. The electro-optic material includes a non-polar solvent and a polar solvent dispersed in the non-polar solvent and controlled by the electric field. The first electrode is disposed on a non-display region of the first substrate including a plurality of pixels each of which having a display region, in which an image is displayed, and the non-display region adjacent to the display region. At least one of a reflective layer and a light sourcing layer defines an amount of light passed through the display area.

18 Claims, 6 Drawing Sheets

ELECTRO-OPTIC DISPLAY

CROSS-REFERENCE TO RELATED APPLICATION

This application relies for priority upon Korean Patent Application No. 2008-98650 filed on Oct. 8, 2008, the contents of which are herein incorporated by reference in their entirety.

BACKGROUND

1. Field of Invention

The present disclosure of invention relates to electro-optic displays. More particularly, the present disclosure relates to an electro-optic display capable of improved image display quality.

2. Description of Related Technology

Recently, as various electronic appliances, such as mobile phones, PDAs (Personal Digital Assistants), computers and large-scale televisions, have been developed, demands for flat panel displays applicable to the electronic appliances have increased. Further, in the flat panel display area, an e-paper device capable of substituting for real printed paper has been the subject of steadily increasing attention.

Typically, an e-paper type device is fabricated by using an electrophoresis technology that provides a high contrast ratio and has no or minimized dependency on view angles.

Such flat panel displays using electrophoresis technology includes REED devices (Reverse Emulsion Electrophoretic Display, U.S. Pat. No. 5,582,700) developed by Zikon Corporation of California. The REED technology realizes images by interposing electro-optic materials of a non-polar continuous phase and of a polar dispersed phase between upper and lower electrodes, and by applying a voltage between the upper and lower electrodes to thereby control the arrangement of the electro-optic materials of the polar dispersed phase.

However, while the REED device is successful in reflecting external light with high contrast ratio and reducing glare; when it displays an image, the electro-optic materials of the polar dispersed phase are randomly arranged or tend to be moved down toward the lower electrode, thereby exerting a detrimental influence on the aperture ratio of its pixels. The reduced aperture ratio tends to disadvantageously reduce the amount of light transmittance through each pixel and thus the contrast ratio tends to be disadvantageously lowered by this effect.

SUMMARY

An exemplary embodiment of the present disclosure provides an electro-optic display having a novel lower substrate structure that is capable of improving per pixel aperture ratio.

In one exemplary embodiment, an electro-optic display includes a first substrate provided thereon with a first electrode, a second substrate provided thereon with a second electrode forming an electric field in cooperation with the first electrode, and an electro-optic material interposed between the first and second substrates.

The first electrode is disposed in a non-display region of the first substrate including a plurality of pixels including a display region, in which an image is displayed, and the non-display region adjacent to the display region.

The second electrode is disposed on the second substrate while facing the first electrode to form an electric filed with the first electrode.

The electro-optic material includes a non-polar solvent forming a continuous phase and a polar solvent forming droplets dispersed in the non-polar solvent and controlled by the electric field.

The first substrate includes a gate line arranged in one direction of the first substrate in the non-display region, a data line crossing the gate line in the non-display region, and a thin film transistor connected to the gate line and the data line in the non-display region.

The first electrode may be positioned above the thin film transistor. In addition, the first electrode may be positioned above the gate line and the data line.

The electro-optic display further comprises a reflective layer. In one embodiment, the reflective layer is disposed on a first surface of the first substrate opposing a second surface of the first substrate. The second surface of the first substrate faces the second substrate.

In another embodiment, the reflective layer is disposed on a surface of the first substrate facing the second substrate, and spaced apart from the first electrode in the display region. The reflective layer includes one of a titanium oxide, barium sulfate, alumina, silver, platinum, and gold.

The electro-optic display further comprises a backlight emitting light generating light to supply the light to the display region. The first electrode may include a transparent conductive material or an opaque conductive material.

The non-polar solvent includes at least one selected from the group consisting of $C_{1-30}$ alkane, $C_{2-30}$ alknene, $C_{3-30}$ alkyne, $C_{3-30}$ aldehyde, $C_{3-30}$ ketone, $C_{2-30}$ ether, $C_{2-30}$ ester, $C_{3-30}$ thioester, terpene, $C_{2-30}$ organosilane, $C_{2-30}$ organosiloxane, an aromatic compound, and combination thereof.

The polar solvent comprises at least one selected from the group consisting of alcohol, amine, amide, ketone, carboxylic acid, carboxylic acid salt, glycol, polyether, sulfide, sulfonic acid, sulfonic acid salt, sulfate, phosphide, phosphite, phosphonite, phosphinite, phosphate, phosphonate, phosphinate, imide, nitrile, isonitrile, amidine, nitro compound, nitroso compound, sulfoxide, sulfonate, thiol, water, or combination thereof.

More preferably, the polar solvent includes at least one selected from the group consisting of dimethyl sulfoxide (DMSO), dimethyl formamide (DMF), methanol, ethanol, glycol, nitromethane, acetonitrile, methoxyethanol, methyl cellosolve, monoethyl ether, or combination thereof.

The polar solution may further include a dye that is not dissolved in the non-polar solvent, and the dye may include at least one selected from the group consisting of monazo dyes, diazo dyes, triphenylmethane dyes, pyrazolone dyes, acridines, porphyrines, diformazan dyes, squarain dyes, oxazines, formazan dyes, colored metals and transition metal complexes, metal salts, acid anthraquinone dyes, amphoteric anthraquinone dyes, diphenylmethane dyes, polymethine dyes, thiazines, phthalocyanines, and tetrazolium dyes.

The polar solvent may be charged with positive charges or negative charges. If a voltage is applied to the first and second electrodes, the polar solvent is collected on an electrode having polarity opposite to that of the charges.

As described above, the first electrode is provided in the non-display region, thereby densely collecting the polar solvent including electro-optic materials into the non-display region when charged with an attractive voltage that attracts the charged particles of the polar solvent. Accordingly, the first electrode prevents an aperture ratio from being lowered due to the polar solvent, thereby improving image display quality. In addition, the first electrode is substituted for a black matrix, so that the manufacturing cost of the black matrix can be reduced.

BRIEF DESCRIPTION OF THE DRAWINGS

The above and other advantages of the present disclosure of invention will become more readily apparent by reference to the following detailed description when considered in conjunction with the accompanying drawings wherein:

FIG. 3 is a sectional view showing a state of the electro-optic display of FIG. 2 when the electro-optic display is powered on;

DETAILED DESCRIPTION

Hereinafter, exemplary electro-optic display devices will be described in detail with reference to the accompanying drawings. It should be understood that the present disclosure is not limited to the appended drawings but instead is understood to include all modifications, equivalents and alternatives within the spirit and scope of the present disclosure as will be understood by those skilled in the relevant art. The appended drawings are not necessarily to scale, and often present a somewhat extended or reduced representation of partial elements to illustrate various layers and regions more clearly. In the figures, reference numerals refer to the same or equivalent parts of the present disclosure throughout the figures of the drawing.

As used herein, the terms 'continuous phase' and 'dispersed phase' are related to a material dispersion system in which a first material forms a homogeneous host phase and a second material is dispersed in the first material, for example in the form of fine particles. In such a dispersion system, the term 'continuous phase' is opposed to the term 'dispersed phase', and 'continuous phase' refers to the homogeneous host phase material or first phase which surrounds and hosts the dispersed second material or second phase whereby the material dispersion system has two phases mixed together therein and presented as a continuum therein. The term, 'dispersed phase' refers to the second phase which is dispersed as fine particles or the like in the continuous phase. In one embodiment, a surfactant acts as an intermediate interposed between the continuous phase material and the dispersed phase material so as to thereby allow the dispersed phase material to be dispersed in the host. Additionally, as used herein, the term 'emulsion' refers to a heterogeneous system including a continuous phase and a non-continuous phase, where the non-continuous phase is capable of forming coalesced droplets in the continuous phase.

The continuous phase or the dispersed phase may each have a solid phase material, a liquid phase material, and a gas phase material. The liquid phase will be assumed here for the purpose of explanation in the present disclosure although the present disclosure of invention is not limited to material dispersion systems having only liquid phase materials.

Figure 1:
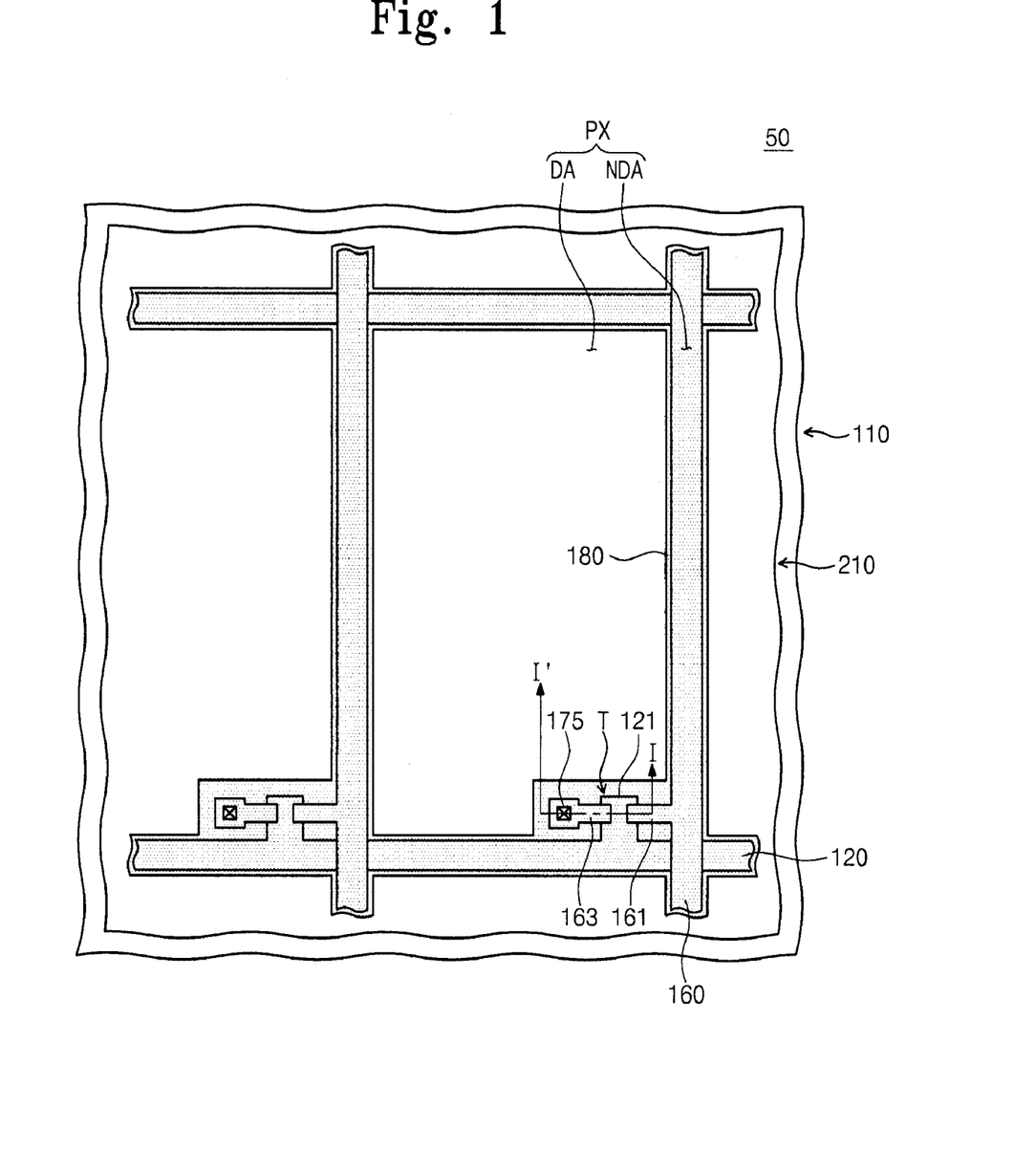
FIG. 1 is a plan view showing an electro-optic display according to a first exemplary embodiment.
Figure 2:
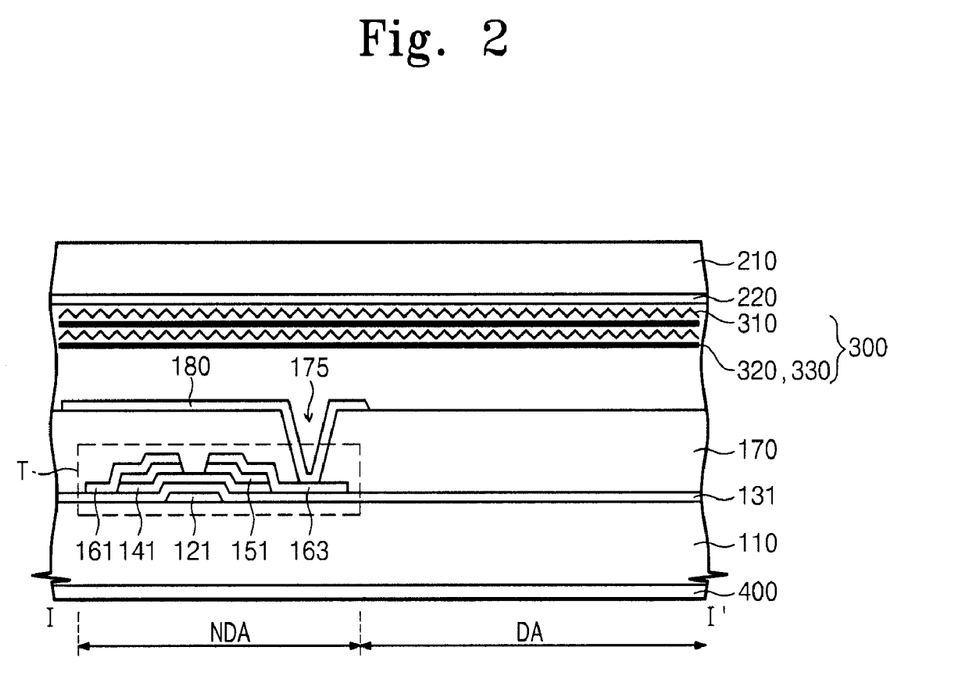
FIG. 2 is a sectional view taken along line I-I' of FIG. 1.
Figure 3:
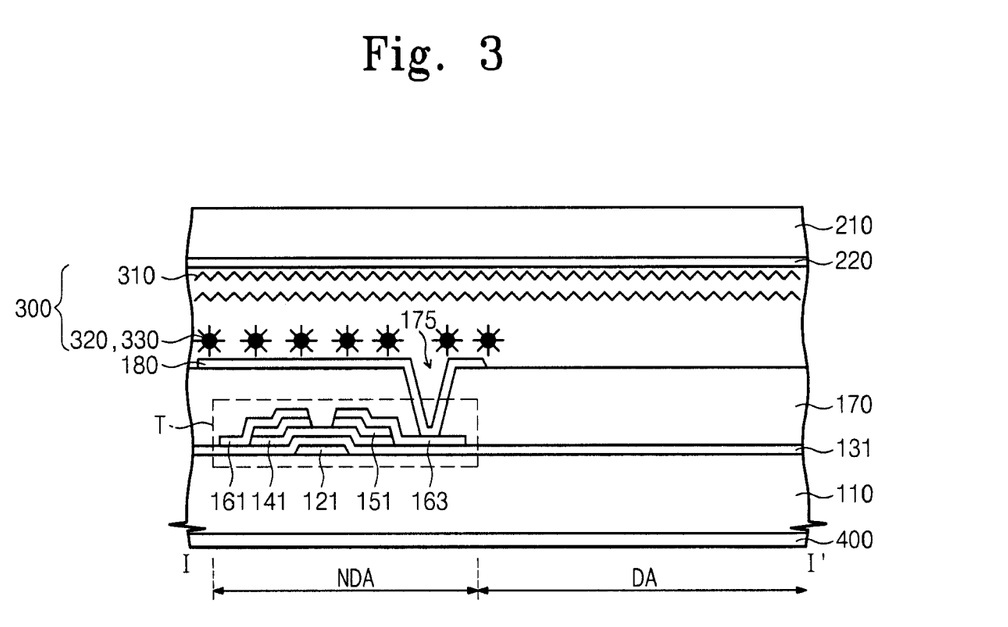

FIG. 1 is a plan view showing an electro-optic display 50 according to a first exemplary embodiment of the present disclosure, and FIG. 2 is a sectional view taken along line I-I' of FIG. 1. FIG. 3 is a sectional view showing a state of the electro-optic display 50 of FIG. 2 when the electro-optic display 50 is powered on.

Referring to FIGS. 1, 2, and 3, the electro-optic display 50 includes a first substrate (array substrate) 110 provided thereon with a first electrode (pixel electrode) 180, a second substrate 210 provided thereon with a second electrode (common electrode) 220 facing the first electrode 180, and an electro-optic material 300 interposed between the first and second substrates 110 and 210.

The first substrate 110 (array substrate) is provided thereon with a plurality of gate lines 120 extending in a first direction and parallel to each other, and a plurality of data lines 160 extending in a second direction while crossing the gate lines 120 and parallel to each other. For the purpose of explanation, among the gate lines 120 and the data lines 160, one gate line and one data line will be representatively described below. The gate line 120 and the data line 160 define one pixel PX in cooperation with boundaries defined by adjacent gate and data lines. The pixel PX is divided into a display region DA, through which light of a currently displayed image is passed, and a non-display region NDA adjacent to the display region DA where the NDA portion of the pixel blocks light from passing therethrough. The gate line 120 and the data line 160 portions of the pixel are arranged in the non-display region NDA. A thin film transistor T is provided at an intersection of the gate line 120 and the data line 160.

The thin film transistor T includes a gate electrode 121, a gate insulating layer 131, a semiconductive active layer 141, an ohmic-contact layer 151, a source electrode 161, and a drain electrode 163. The TFT defines part of the NDA.

The gate electrode 121 braches from the gate line 120 to be electrically connected to the gate line 120. The gate insulating layer 131 includes a silicon nitride (SiNx), a silicon oxide (SiOx), and/or the like, and insulates the gate electrode 121 from other conductors. The semiconductive active layer 141 includes amorphous silicon (a-Si) disposed on the gate insulating layer 131. The active layer 141 is overlapped by the gate electrode 121. The ohmic-contact layer 151 includes amorphous silicon doped with conductivity type impurities, and is formed on the active layer 141. The source electrode 161 is connected to the data line 160 and provided on the gate insulating layer 131 and the ohmic-contact layer 151. The drain electrode 163 is spaced apart from the source electrode 161 and provided on the gate insulating layer 131 and the ohmic-contact layer 151. The thin film transistor TFT is protected from electrical and physical shocks as well as corrosive chemicals by a protective layer 170.

The protective layer 170 is formed on the gate insulating layer 131, the active layer 141, the source electrode 161, and the drain electrode 163 to achieve insulation and planarization. The protective layer 170 includes at least one of an organic material and an inorganic material to improve insulation and leakage current characteristics of the thin film transistor T. The protective layer 170 includes a contact hole 175 defined there through to expose a contactable portion of the drain electrode 163.

The first electrode (pixel-electrode) 180 is overlapped with the gate line 120, the data line 160, and the thin film transistor T, and provided only in the non-display region NDA. (This is to be contrasted with an LCD type display where its pixel-electrode extends across the entire DA as well.) In detail, the first electrode 180 is connected to the thin film transistor T and placed on the protective layer 170. The first electrode 180 is connected to the drain electrode 163 of the thin film transistor T through the contact hole 175. The first electrode 180 is placed above the gate line 120 and the data line 160. In addition, the first electrode 180 is placed above the thin film transistor T. The first electrode 180 has an area sufficient to cover the gate line 120, the data line 160, and the thin film transistor T of the pixel when viewed in a head-on plan view. Although the first electrode 180 is wider than each of the gate line 120 and the data line 120 when viewed in a plan view as shown in FIG. 1, in other embodiments the first electrode 180 may have a width narrower than or identical to those of the gate line 120 and the data line 160. The first electrode 180 may include a transparent conductive material such as indium tin oxide (ITO), indium zinc oxide (IZO), or the like. In addition, since it does not cover the DA, the first electrode 180 may include an opaque conductive material such as aluminum (Al), copper (Cu), or chromium (Cr).

Meanwhile, a reflective layer 400 is provided on a second major surface (e.g., bottom) of the first substrate 110 in opposition to a first surface of the first substrate 110 having the first electrode 180. The reflective layer 400 is formed on the entire lower surface of the first substrate 110 to reflect light that is supplied from an exterior. For example, the reflective layer 400 reflects light, which has been incident from an upper portion of the second substrate 210, to the first substrate 110. The light reflected from the reflective layer 400 passes through the display region DA. The reflective layer 400 may include one or more of a titanium oxide (TiOx), barium sulfate ($BaSO_4$), alumina ($Al_2O_3$), silver (Ag), platinum (Pt), and gold (Au).

The second substrate 210 is provided above the first substrate 110 while facing the first substrate 110. The second substrate 210 includes the second electrode 220 facing the first electrode 180. The second electrode 220 forms an electric field in cooperation with the first electrode 180 if voltage is supplied from an exterior circuit.

The second electrode 220 may include a transparent conductive material such as indium tin oxide (ITO), indium zinc oxide (IZO), or the like such that external light passes through the second electrode 220.

The electro-optic material 300 includes a non-polar solvent 310 and a polar solvent 320, and is interposed between the first electrode 180 and the second electrode 220.

As understood by those skilled in the art, typically a polar solvent is nonmiscible in a nonpolar solvent and vise versa. However, here the non-polar solvent 310 forms a continuous phase of the electro-optic material 300 while the polar solvent 320 forms a dispersed phase. The non-polar solvent 310 may be colored or colorless. In the illustrated embodiment, the non-polar solvent 310 is colorless. The non-polar solvent 310 may include at least one organic compound selected from the group consisting of a $C_{1-30}$ alkane, a $C_{2-30}$ alknene, a $C_{3-30}$ alkyne, a $C_{3-30}$ aldehyde, a $C_{3-30}$ ketone, a $C_{2-30}$ ether, a $C_{2-30}$ ester, a $C_{3-30}$ thioester, a terpene, a $C_{2-30}$ organosilane, a $C_{2-30}$ organosiloxane, and an aromatic compound. In addition, the non-polar solvent 310 may include an aromatic compound selected from the group consisting of benzene, toluene, and tetraline.

As mentioned, the polar solvent 320 forms a non-continuous phase of the electro-optic material 300 and is dispersed in the non-polar solvent 310 for example in the shape of small or microscopic droplets. The polar solvent 320 may include at least one compound selected from the group consisting of alcohol, amine, amide, ketone, carboxylic acid, carboxylic acid salt, glycol, polyether, sulfide, sulfonic acid, sulfonic acid salt, sulfate, phosphide, phosphite, phosphonite, phosphinite, phosphate, phosphonate, phosphinate, imide, nitrile, isonitrile, amidine, nitro compound, nitroso compound, sulfoxide, sulfonate, thiol, and water.

Preferably, the polar solvent 320 may include at least one compound selected from the group consisting of dimethyl sulfoxide (DMSO), dimethyl formamide (DMF), methanol, ethanol, glycol, nitromethane, acetonitrile, methoxyethanol, methyl cellosolve, and monoethyl ether.

The polar solvent 320 includes a dye 330 that is dissolved (is soluble) in the polar solvent 320 but not in the non-polar solvent 310. In other words, the dye 330 is dissolved in the polar solvent 320 alone. The polar solvent 320 expresses light absorption or colors (selective absorption of some wavelengths) through its miscible dye 330. As shown in FIGS. 2 and 3, since the dye 330 is dissolved in the polar solvent 320, the polar solvent 320 and the dye 330 are shown in the same position in the schematic drawings.

The dye 330 may include at least one compound selected from the group consisting of monazo dyes, diazo dyes, triphenylmethane dyes, pyrazolone dyes, acridines, porphyrines, diformazan dyes, squarain dyes, oxazines, formazan dyes, colored metals and transition metal complexes, metal salts, acid anthraquinone dyes, amphoteric anthraquinone dyes, diphenylmethane dyes, polymethine dyes, thiazines, phthalocyanines, and tetrazolium dyes.

The polar solvent 320 can be more uniformly dispersed and distributed in the non-polar solvent 310 (with aid of a surfactant fro example) than can its internally contained dye. Accordingly, the electro-optic display 50 can represent smoothly distributed colors obtained by combining the dye 330, the polar solvent 320, and the non-polar solvent 310 one within the next as recited.

The electro-optic material 300 further typically includes detergent or another surfactant (not shown) which functions to lower surface tension at an interfacial surface between the non-polar solvent 310 and the polar solvent 320. The polar solvent 320 having a dispersed phase may be more easily dispersed in the non-polar solvent 310 having a continuous phase by action of the surfactant.

The surfactant and the polar solvent 320 containing the dye 330 form reverse micelles in the continuous phase of the non-polar solvent 310. The reverse micelles are formed from the polar solvent 320 surrounded by the surfactant where the latter structures are dispersed within the continuous phase of the non-polar solvent 310. The surfactant allows the polar solvent 320 to be easily dissolved in the non-polar solvent 310. Accordingly, the electro-optic material 300 can be made opaque by absorption of light by the dye dissolved inside the dispersed polar solvent 320.

The polar solvent 320 may be charged with positive electrical charges or negative charges. The polar solvent 320 may be arranged as a planar structure or coalesced into a smaller region depending on whether there is an electric field present and depending on the direction (polarity) of an electric field (e.g., repulsive or attractive to the charged particles of the polar solvent). For example, if the polar solvent 320 is charged with positive charges and the electric filed is not formed between the first and second electrodes 180 and 220, the polar solvent 320 is randomly distributed throughout the cell so as to well absorb external light. In the case where an electric field is formed between the first and second electrodes 180 and 220, the polar solvent 320 may move toward and coalesce about the electrode having the relatively negative polarity. In contrast, if the polar solvent 320 is charged with negative charges, the polar solvent 320 may move toward the electrode having the relatively positive polarity.

Referring to FIG. 3, in a state in which the polar solvent 320 has polarity opposite to that of the first electrode 180, if power is applied to the first electrode 180, the polar solvent 320 may move down toward and coalescing about the first electrode 180. For example, if a common voltage is applied to the second electrode 220, and a pixel voltage, which is less than the common voltage by about −10V, is applied to the first electrode 180, the polar solvent 320 having positive charges may move down toward the first electrode 180 to aggregate there about. Accordingly, since the polar solvent 320 is arranged adjacent to the first electrode 180 in this state, the first electrode 180 is covered with the polar solvent 320 and the dye 310 that represent a corresponding color. In other words, in this charge attracting state, the first electrode 180 attracts and collects the polar solvent 320 to itself and serves as a black matrix.

The attraction speed and mobility of the polar solvent 320 may be adjusted to be a function of the intensity of the applied driving voltage. Accordingly, the polar solvent 320 can represent different gray scales by controlling the pixel voltage of the first electrode 180. Since the attraction speed and mobility of the polar solvent 320 are increased as the pixel voltage is increased, when differing gray scale voltages are applied, a first portion of the polar solvent 320 remains behind as randomly arranged between the first and second electrodes 180 and 220, and a remaining second portion of the polar solvent 320 moves to and coalesces about the first electrode 180, thereby enhancing light transmittance such that a gray scale can be expressed in the DA area of the pixel. For example, the electro-optic display 50 represents black when the pixel voltage is 0V and none of the polar solvent 320 is attracted to the first electrode 180. In addition, when the pixel voltage is less than the common voltage by about −5V, the so-driven pixel of the electro-optic display 50 represents a midlevel gray. When the pixel voltage is less than the common voltage by about −10V, the so-driven pixel of the electro-optic display 50 represents a white level. (In the case where the dye of a given pixel is colored as a red, blue and green expressing dye, it is understood that the corresponding color becomes lighter or darker in response to the applied drive voltage.)

The distribution of the polar solvent 320 may be dependent on variables such as a distance between the first and second electrodes 180 and 220, a voltage offset, and a voltage frequency.

In the electro-optic display 50 according to the present exemplary embodiment, the reflective layer 400 is disposed on the second (lower major) surface of the first substrate 110 to reflect external light, so that the reflective region of light that passes through the cell above can be enlarged, and reflectance of light from a white pixel can be improved.

Figure 4:
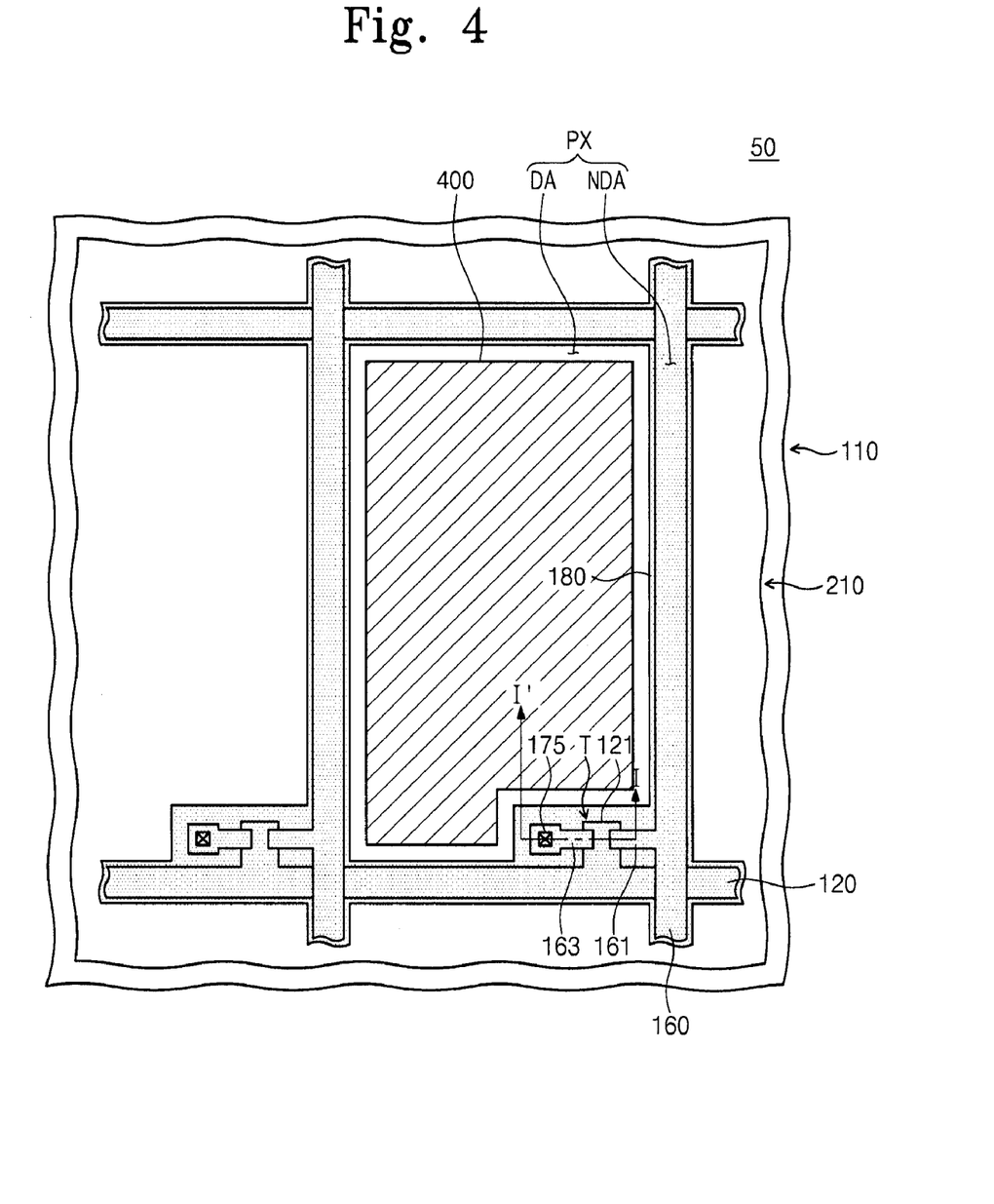
FIG. 4 is a plan view showing an electro-optic display according to a second exemplary embodiment.
Figure 5:
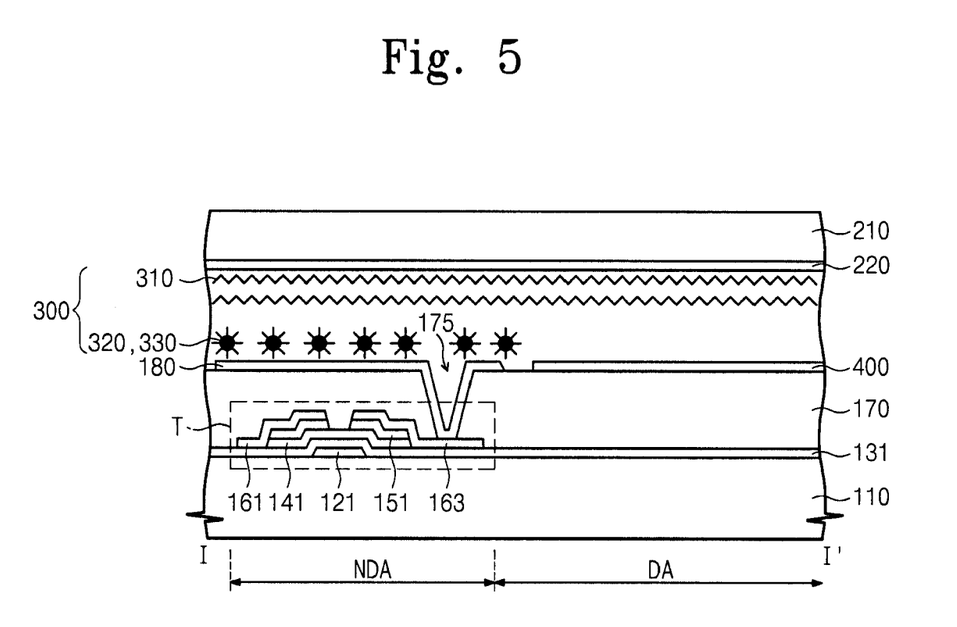
FIG. 5 is a sectional view taken along line I-I' of FIG. 4.

FIG. 4 is a plan view showing the electro-optic display 50 according to a second exemplary embodiment. FIG. 5 is a sectional view taken along line I-I' of FIG. 4. Details of elements identical to those of FIGS. 1 and 3 will be omitted in order to avoid redundancy.

Referring to FIGS. 4 and 5, the first substrate 110 includes the pixel PX defined by the gate line 120 and the data 160. The pixel PX is partitioned into the display region DA, in which light of an image is selectively shuttered by action of moved dye miscles, and the non-display region NDA adjacent to the display region DA. The non-display region NDA is provided therein with the gate line 120, the data line 160, and the thin film transistor T connected to the gate line 120 and the data line 160. The non-display region NDA is provided therein with the first electrode 180 that is connected to the thin film transistor T and overlapped with the gate line 120, the data line 160, and the thin film transistor T.

The reflective layer 400 is provided in the display region DA of the first substrate 110. The reflective layer 400 is spaced apart from the first electrode 180 by a predetermined distance in the display region DA. The reflective layer 400 reflects light from the upper portion of the first substrate 110.

The reflective layer 400 may include one of titanium oxide (TiOx), barium sulfate (BaSO4), alumina (Al2O3), silver (Ag), platinum (Pt), and gold (Au).

In the electro-optic display 50 according to the present exemplary embodiment, the reflective layer 400 is provided in the display region DA of the upper portion of the first substrate 110 to reflect external light, thereby reducing loss of light transmittance as compared to FIG. 2.

Figure 6:
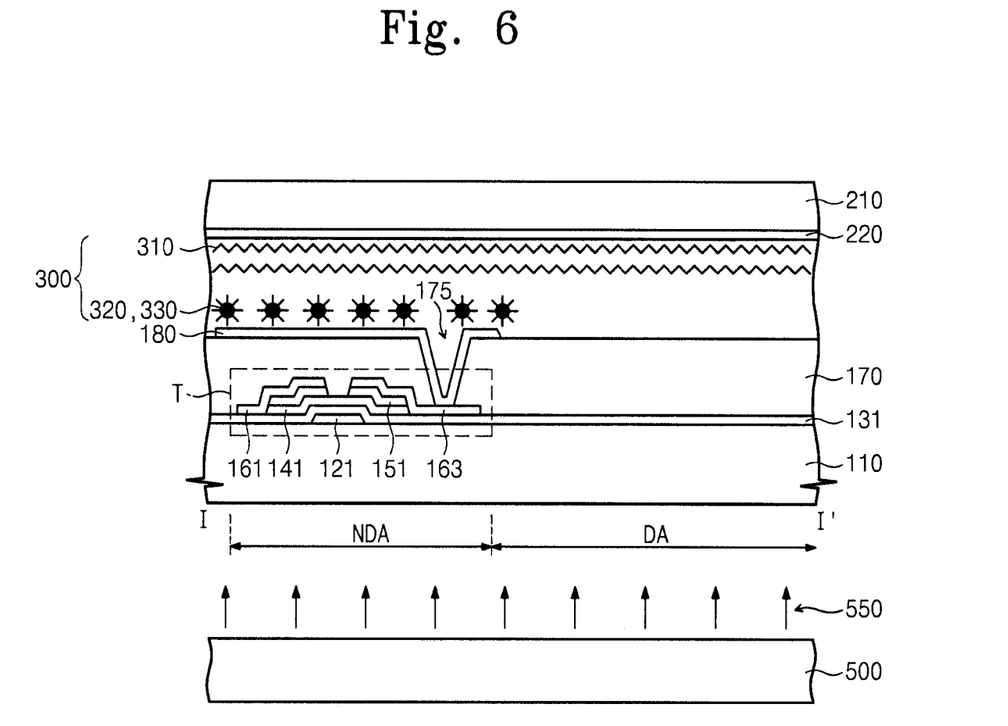
FIG. 6 is a sectional view showing an electro-optic display according to a third exemplary embodiment.

FIG. 6 is a sectional view showing the electro-optic display 50 according to a third exemplary embodiment. Details of elements identical to those of FIGS. 1 and 3 will be omitted in order to avoid redundancy.

Referring to FIG. 6, the electro-optic display 50 includes the first substrate 110 provided thereon with the first electrode 180, the second substrate 210 provided thereon with the second electrode 220 forming an electric field with the first electrode 180, and the electro-optic material 300 interposed between the first substrate 110 and the second substrate 210. In addition, the electro-optic display 50 includes a backlighting unit 500 provided below the first substrate 110.

The first substrate 110 includes the display region DA, in which an image is displayed, and the non-display region NDA adjacent to the display region DA. The non-display region NDA is provided therein with the thin film transistor T and the first electrode 180 connected to the thin film transistor T. In the display region DA, external light passes through the second electrode 220 including a transparent conductive material.

The electro-optic material 300 includes the non-polar solvent 310 and the polar solvent 320, and is interposed between the first and second electrodes 180 and 120.

The backlight unit 500 emits light 550 to supply the light 550 to the first substrate 110 and the electro-optic material 300. The light 550 is incident onto the first substrate 110 to pass through the display region DA. The light 550 passed through is expressed as a gray scale in each pixel according to the amount of polar solvent 320 provided in the display region DA.

The electro-optic display 50 according to the present exemplary embodiment displays an image using the light 550 of the backlight 500, thereby improving brightness as compared with external light.

Although the exemplary embodiments have been described, it is understood that the present disclosure should not be limited to these exemplary embodiments but various changes and modifications can be made by one ordinary skilled in the art within the spirit and scope of the present disclosure as provided here.

What is claimed is:

1. An electro-optic display comprising:
 a first substrate comprising a plurality of pixels, each pixel comprising a display region, in which an image is displayed, and a non-display region adjacent to the display region;
 a first electrode disposed in the non-display region;
 a second substrate facing the first substrate, the second substrate having a second electrode disposed on the second substrate and facing the first electrode to form an electric filed with the first electrode; and
 an electro-optic material interposed between the first electrode and the second electrode and comprising a non-polar solvent, and a polar solvent dispersed in the non-polar solvent and controlled by the electric field.

2. The electro-optic display of claim 1, wherein the first substrate further comprises:
 a gate line arranged in the non-display region;

a data line crossing the gate line in the non-display region; and a thin film transistor connected to the gate line and the data line in the non-display region.

3. The electro-optic display of claim 2, wherein the first electrode is positioned above the thin film transistor.

4. The electro-optic display of claim 2, wherein the first electrode is positioned above the gate line and the data line.

5. The electro-optic display of claim 1, further comprising a reflective layer disposed on a first surface of the first substrate opposing a second surface of the first substrate, in which the second surface of the first substrate faces the second substrate.

6. The electro-optic display of claim 5, wherein the reflective layer comprises one of a titanium oxide, barium sulfate, alumina, silver, platinum, and gold.

7. The electro-optic display of claim 1, further comprising a reflective layer disposed on a surface of the first substrate facing the second substrate and spaced apart from the first electrode.

8. The electro-optic display of claim 7, wherein the reflective layer comprises one of a titanium oxide, barium sulfate, alumina, silver, platinum, and gold.

9. The electro-optic display of claim 1, further comprising a backlight unit to supply the light to the display region.

10. The electro-optic display of claim 9, wherein the first electrode comprises an opaque conductive material.

11. The electro-optic display of claim 9, wherein the first electrode comprises a transparent conductive material.

12. The electro-optic display of claim 1, wherein the polar solvent comprises a dye dissolved in the polar solvent.

13. The electro-optic display of claim 12, wherein the polar solvent is charged with predetermined charges.

14. The electro-optic display of claim 12, wherein the dye comprises at least one selected from the group consisting of monazo dyes, diazo dyes, triphenylmethane dyes, pyrazolone dyes, acridines, porphyrines, diformazan dyes, squarain dyes, oxazines, formazan dyes, colored metals and transition metal complexes, metal salts, acid anthraquinone dyes, amphoteric anthraquinone dyes, diphenylmethane dyes, polymethine dyes, thiazines, phthalocyanines, and tetrazolium dyes.

15. The electro-optic display of claim 1, wherein the non-polar solvent comprises at least one selected from the group consisting of $C_{1-30}$ alkane, $C_{2-30}$ alknene, $C_{3-30}$ alkyne, $C_{3-30}$ aldehyde, $C_{3-30}$ ketone, $C_{2-30}$ ether, $C_{2-30}$ ester, $C_{3-30}$ thioester, terpene, $C_{2-30}$ organosilane, $C_{2-30}$ organosiloxane, and an aromatic compound.

16. The electro-optic display of claim 15, wherein the non-polar solvent comprises an aromatic compound selected from the group consisting of benzene, toluene, and tetraline.

17. The electro-optic display of claim 1, wherein the polar solvent comprises at least one selected from the group consisting of alcohol, amine, amide, ketone, carboxylic acid, carboxylic acid salt, glycol, polyether, sulfide, sulfonic acid, sulfonic acid salt, sulfate, phosphide, phosphite, phosphonite, phosphinite, phosphate, phosphonate, phosphinate, imide, nitrile, isonitrile, amidine, nitro compound, nitroso compound, sulfoxide, sulfonate, thiol, and water.

18. The electro-optic display of claim 17, wherein the polar solvent comprises at least one selected from the group consisting of dimethyl sulfoxide (DMSO), dimethyl formamide (DMF), methanol, ethanol, glycol, nitromethane, acetonitrile, methoxyethanol, methyl cellosolve, and monoethyl ether.

* * * * *